(12) United States Patent
Cobb et al.

(10) Patent No.: US 7,797,848 B2
(45) Date of Patent: Sep. 21, 2010

(54) FOLDING CARPENTER'S LEVEL

(76) Inventors: Stephen Ray Cobb, 6202 Marble Hollow La., Katy, TX (US) 77450; Corey Keith Dillon, 6314 Marble Hollow, Katy, TX (US) 77450; Todd Steven Shipp, 6206 Marble Hollow La., Katy, TX (US) 77450

(*) Notice: Subject to any disclaimer, the term of this patent is extended or adjusted under 35 U.S.C. 154(b) by 69 days.

(21) Appl. No.: 12/217,395

(22) Filed: Jul. 3, 2008

(65) Prior Publication Data

US 2010/0000107 A1   Jan. 7, 2010

(51) Int. Cl.
*G01C 9/20* (2006.01)
(52) U.S. Cl. .......................... 33/374; 33/451
(58) Field of Classification Search ............... 33/374, 33/375, 383, 452, 465, 809, 451
See application file for complete search history.

(56) References Cited

U.S. PATENT DOCUMENTS

| | | | |
|---|---|---|---|
| 120,675 A | 11/1871 | Shelley | |
| 782,827 A | 7/1903 | Chambers | |
| 740,742 A * | 10/1903 | Bush | 33/374 |
| 794,409 A * | 7/1905 | Irving, Jr. | 33/465 |
| 830,796 A * | 9/1906 | Masters | 33/374 |
| 986,001 A * | 3/1911 | Hendrickson | 33/341 |
| 1,014,402 A | 1/1912 | Larsen | |
| 1,132,318 A | 3/1915 | Feder | |
| 1,210,370 A | 12/1916 | Dvorak | |
| 1,489,239 A * | 4/1924 | Eagan | 33/374 |
| 1,605,604 A | 11/1926 | Nerbon | |
| 1,655,766 A | 1/1928 | Hildebrant | |
| 1,806,396 A | 5/1931 | Hartwell | |
| 2,454,133 A | 11/1948 | Buchhom | |
| 2,495,558 A * | 1/1950 | Walton | 33/452 |
| 2,535,791 A | 12/1950 | Fluke | |
| 2,652,628 A | 9/1953 | Jensen et al. | |
| 2,728,989 A | 1/1956 | Laggren | |
| 2,741,030 A * | 4/1956 | Wise | 33/465 |
| 2,752,692 A * | 7/1956 | Smith | 33/374 |
| 2,807,888 A * | 10/1957 | Thomas | 33/374 |
| 2,878,569 A | 3/1959 | Metrulis | |

(Continued)

*Primary Examiner*—G. Bradley Bennett
(74) *Attorney, Agent, or Firm*—L. Wayne White

(57) ABSTRACT

A folding carpenter's level is disclosed which has two level segments, each of which has a smooth flat top and bottom surface, that are hingeably attached at a distal tip by means of a recessed, flat hinging means. The two level segments can be rotated laterally in the plane of the level so as to be oriented with respect to each other at angles of from 0 to 180 degrees, thus effectively doubling the length of the level. At least one of the level segments has one or more tubular spirit vials attached to the segment for measuring the levelness of the top surface with respect to horizontal. The level segments usually have additional tubular spirit vials oriented vertically to allow the tool to be used to measure plumb. Such tubular spirit vials are generally located in apertures so that the spirit bubble in the vials can be seen from the front or the back of the folding level. The folding level can beneficially include other recessed features, such as a fastening means to hold the segments together in a folded configuration, and a locking means to hold the segments secure when the segments are rotated 180 degrees with respect to each other so that the tops of the segments form a smooth flat surface with a straight edge.

10 Claims, 5 Drawing Sheets

U.S. PATENT DOCUMENTS

| | | | |
|---|---|---|---|
| 3,522,657 A * | 8/1970 | Metrulis | 33/342 |
| 3,783,518 A | 1/1974 | Jones | |
| 3,934,351 A | 1/1976 | Sullivan | |
| 4,130,943 A | 12/1978 | Talbot | |
| 4,151,650 A | 5/1979 | Russo | |
| 4,152,838 A | 5/1979 | Cook | |
| 4,317,289 A | 3/1982 | Conn | |
| 4,813,149 A | 3/1989 | Herkimer | |
| 4,928,395 A | 5/1990 | Good | |
| 5,412,875 A | 5/1995 | Hilderbrandt | |
| 5,433,011 A | 7/1995 | Scarborough et al. | |
| 5,438,761 A | 8/1995 | Krumszyn et al. | |
| 5,459,935 A | 10/1995 | Paulson et al. | |
| 5,577,327 A | 11/1996 | Archambault | |
| 5,839,201 A | 11/1998 | Young | |
| 5,881,468 A | 3/1999 | Baumann | |
| 6,029,359 A * | 2/2000 | Szumer | 33/374 |
| 6,041,510 A | 3/2000 | Huff | |
| 6,282,805 B1 | 9/2001 | Cosentino | |
| 6,293,023 B1 | 9/2001 | Schooley | |
| 6,643,942 B1 * | 11/2003 | Russell | 33/452 |
| 6,807,743 B2 | 10/2004 | Odachowski | |
| 6,836,973 B1 | 1/2005 | Eccles, Jr. | |
| 7,281,335 B2 | 10/2007 | Feliciano | |
| 2004/0172840 A1 * | 9/2004 | Odachowski | 33/465 |

\* cited by examiner

FOLDING CARPENTER'S LEVEL

CROSS-REFERENCE TO RELATED APPLICATIONS

Not applicable.

STATEMENT REGARDING FEDERALLY SPONSORED RESEARCH AND DEVELOPMENT

Not applicable.

INCORPORATION BY REFERENCE OF MATERIAL SUBMITTED ON A COMPACT DISC

Not applicable

REFERENCE TO A MICROFICHE APPENDIX

Not applicable

BACKGROUND OF THE INVENTION (1) Field of the Invention

The present invention relates to a tool that can be used by craftsmen to determine the levelness of workpieces and associated surfaces, and more particularly to pivoting adjustable carpenter's levels. The novel tool comprises two segments (sections) that are hingeably attached and can be rotated laterally in the plane of the level so as to be oriented with respect to each other at angles from 0 to 180 degrees. This rotation mechanism extends the effective length of the tool by a factor of 2 and it permits measurement of levelness of two or more workpieces which intersect at angles of up to 180 degrees.

(2) Description of Related Art

Craftsmen, such as carpenters, plumbers, electricians, masons, contractors, and even the occasional handyman, make use of certain basic tools in their jobs. Some of the most common tools are levels, squares, straight edges and measuring devices, among others. Such tools have been around for years. Indeed, some have been around for centuries, and many variations, modifications and improvements have been made.

There have also been numerous attempts to combine the functions of several of these commonly used tools into one tool for convenience. E.g., various "square levels" have been described which can function as a level or as a square. United States Patent Number ("U.S. Pat. No.") 120,675, issued to Shelley on Nov. 7, 1871, discloses a square level in two parts (sections, each of which is a spirit level) that are hinged to let the two parts move laterally so as to be oriented with respect to each other at an angle of 90 degrees, and then secured by a hook or other suitable locking device to form a square. Each of the two parts shown in the '675 patent are beveled at one end at an inclination of 45 degrees; and, at the two ends thus formed, a hinge is arranged by which the two parts are secured together and rotate to form the 90 degree angle. Shelley states that if a long level is desirable, the two parts may be opened to bring them in line with each other and thus have a level double the length of one of the parts. A square level is also described in U.S. Pat. No. 732,827, issued to Chambers on Jul. 7, 1903. Chambers discloses a hinged level whose two parts can move vertically so as to be oriented with respect to each other at angles from 0 to 90 degrees. Another square level was disclosed in U.S. Pat. No. 1,210,379, issued to Dvorak on Dec. 26, 1916. Dvorak's tool comprised a hinged level that allowed the two parts (sections, each of which was a spirit level) to move laterally with respect to each other at angles of 0 to 90 degrees. Many other patents have issued in the United States since Shelley, Chambers and Dvorak showing levels with sections that are designed to move with respect to each other to form a square.

The carpenter's level is well known to carpenters and other craftsmen. The carpenter's level is usually a single unit that is manufactured in different lengths. Levels in two foot and four foot lengths are common today, but many are shorter (e.g., 6 to 9 inches) and many are substantially longer (e.g., up to 10 to 12 feet). The front and back of the carpenter's level normally has a rectangular configuration, and the top and bottom of the level are likewise rectangular. The width of the carpenter's level can vary, but it is usually about one inch. The top and bottom of the level are smooth flat surfaces with straight edges. The levels contain at least one tubular spirit vial containing a leveling bubble, and normally two or more, so that the user can determine the levelness of a surface and also the plumb, and in some cases a tubular spirit vial is provided to measure other angles as well. The levels historically were made of wood but recent tools are typically made of aluminum, magnesium or other light-weight durable metal. In addition, the body of the carpenter's level usually has handholds carved into the body, or various apertures have been made, to make the tools easier to hold and manipulate. Most of today's levels are designed in an I-beam configuration (from a cross sectional view), and have two or more tubular spirit vials, each of which is located in an aperture in the body of the level so that the leveling bubble in the vial can be viewed from the front or the back of the level. In addition, they generally have one or more apertures for handholds, and many have protective end caps (usually made of a plastic material, such as polypropylene, nylon, or the like). Carpenter's levels are very useful and very basic tools.

Just as craftsmen found it useful to combine the functions of various tools to make them more compact and versatile, various attempts have been made to find a way to make the carpenter's level more compact and versatile. Many of these attempts have focused on ways of altering the length of the device. The shorter levels are typically easier to carry and store, but sometimes a longer level is needed for quality purposes. Some craftsmen modified the tool by designing modular sections that could be combined to make the level longer. See, for example, U.S. Pat. No. 1,132,318; U.S. Pat. No. 1,605,604; and U.S. Pat. No. 1,655,766 to name but a few early patents on the topic. Others used telescoping techniques to make the level longer or shorter, as needed. See, for example, U.S. Pat. No. 4,130,943; U.S. Pat. No. 4,928,395; U.S. Pat. No. 5,412,875; and U.S. Pat. No. 5,577,327 to name but a few patents on the topic. Still others have made levels having a body portion and extendable members that are rotatably attached to each end of the body portion. See, for example, U.S. Pat. No. 4,813,149.

However, the need still exists for a carpenter's level that can be easily extended in length when needed for longer surfaces, and contracted when needed for shorter surfaces. A need also exists for a carpenter's level that can be used to measure the levelness of intersecting surfaces. These needs are met by the present invention.

BRIEF SUMMARY OF THE INVENTION

A novel folding carpenter's level has now been discovered which comprises two segments (sections) that are hingeably attached at a distal tip by means of a recessed, flat hinging means, and can be rotated laterally in the plane of the level so as to be oriented with respect to each other at angles from 0 to 180 degrees. This rotation mechanism extends the effective length of the tool by a factor of two (2) and it permits measurement of levelness of two or more workpieces which intersect at angles of up to 180 degrees, and is especially useful in measuring the levelness of workpieces at 90 degrees (either as an inside corner measurement or an outside corner measurement). This is advantageous. The novel level folds easily for storage and transportation, and it can be used in the folded position as a conventional carpenter's level or expanded to effectively double the length of the level.

At least one of the level segments has one or more tubular spirit vials with a leveling bubble (aka, a spirit level indicator), and preferably both segments have at least one tubular spirit vials, attached to the segment. The tubular spirit vials are preferably positioned in an aperture in the segment(s) (aka, a sight opening) so that the leveling bubble in the tubular spirit vial can be seen from the front or back of the level segment.

The segments of the folding level can be of solid construction but they preferably have an I-beam type construction (in cross section). Each of the level segments generally has a rectangular configuration from the front, back, top and bottom perspectives. The top and bottom surfaces are each smooth flat surfaces with straight edges. Each of the segments is preferably made of a durable light-weight metal, such as aluminum, magnesium, or an alloy comprising such metals. Each of the segments also preferably has one or more elongated apertures as a handhold to facilitate gripping and handling.

The folding level has a recessed flat hinging means at one end of the level segments. The hinging means is on the front side of the folding level in an extended form. Such hinging means are known in the art.

The folding level has a recessed fastening means at the end of the level segments opposite the hinging means. The fastening means hold the segments together when the level is folded and the fastening means are in a closed position, and are easily released to an open position to permit the segments to rotate about the hinging means. The fastening means are known and can be varied to convenience. Examples include, but are not limited to, a hooking means, a screw-locking means, a clipping means (e.g., a "C-shaped" elastomeric or metal clip that slidably engages the segments), or a magnetic means. Preferably, the fastening means is a magnetic means located on adjacent sides of the segment members when the level is in a folded configuration; thus, the fastening means is preferably located on the back side of the folding level when it is in an extended form.

The folding level preferably has a recessed locking means to secure the segments of the level when it is expanded to its full length. Such locking means include, but are not limited to, a sliding bolt, a locking clasp, or other such known means. A locking clasp is currently preferred. The locking means is on the back side of the folding level in an extended form, and it is generally located opposite the hinging means.

The recessed features (hinging means, fastening means and locking means) make the new level more versatile than prior levels and it has many operational advantages. In the folded position, the new carpenter's level is compact and easy to store and handle. It can also be used as a conventional carpenter's level in the folded position. Additionally, the folding level of the present invention lies flat against the workpieces regardless of whether the front side or the back side of the level is used (folded or expanded).

DETAILED DESCRIPTION OF THE INVENTION

Figure 1:
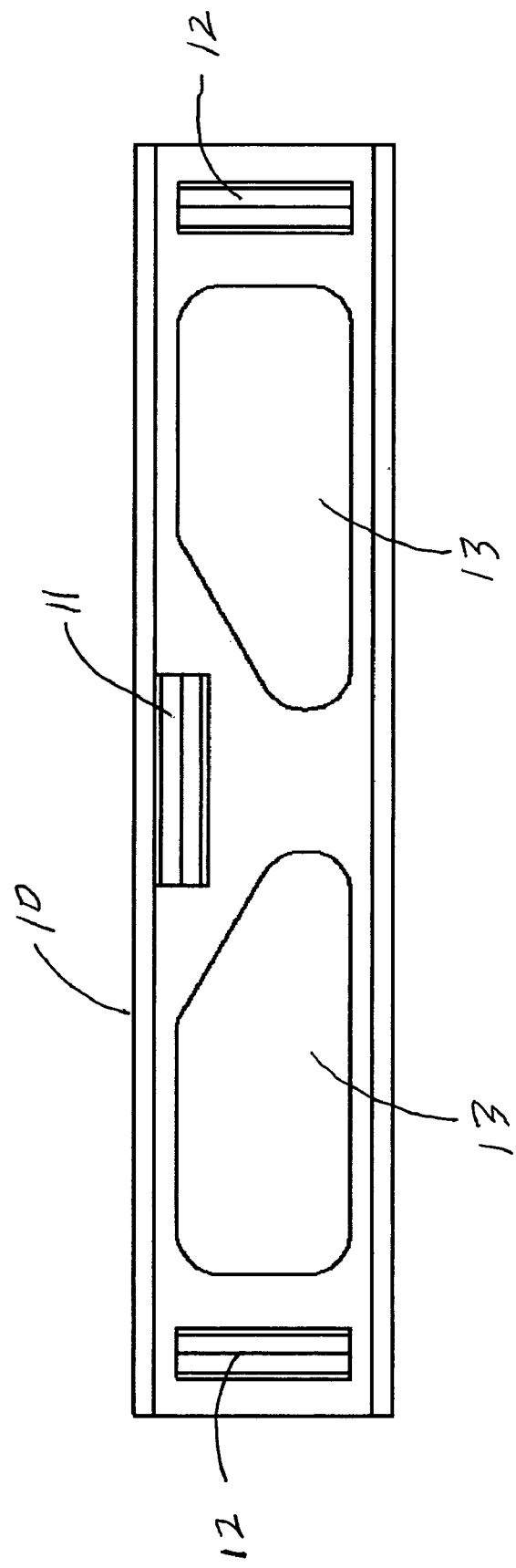
FIG. 1 is a front view of each of the carpenter's level segments.

FIG. 1 illustrates the front view of each of the carpenter's segments 10 in a preferred embodiment of the present invention. Each level segment has in this illustration three separate tubular spirit vials, one of which is oriented horizontally and the other two are oriented vertically. The horizontally oriented spirit vial 11 is generally positioned at or near the top and towards the center of the level segment. The vertically oriented vials 12 are located towards each end of the level segment, from a front view of such segments. The vertically oriented tubular spirit vials are optional, but preferred. The tubular spirit vials are contained within sight openings and are preferably visible from the front and back sides of the level segments. The horizontally oriented tubular spirit vial is also preferably visible from the top of the level segments through an opening 16 in the top surface of the level segment. One or more elongated apertures 13 (or cutouts, as they are sometimes called) are presented as handholds. Such handholds are optional, but preferred to facilitate gripping and handling.

Figure 2:
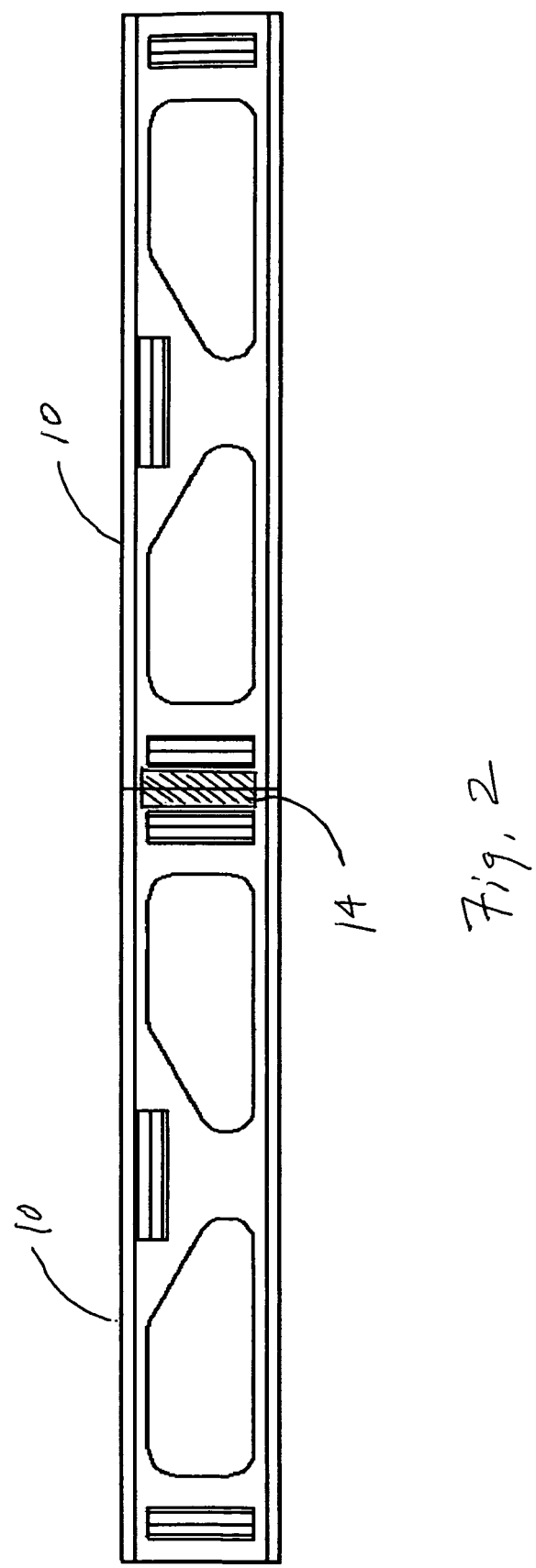
FIG. 2 is a front view of the folding level in an extended form.

FIG. 2 illustrates the front view of the folding level in an extended form. In this drawing, two level segments 10 are abutted end-to-end and joined via a recessed hinging means 14.

Figure 3:
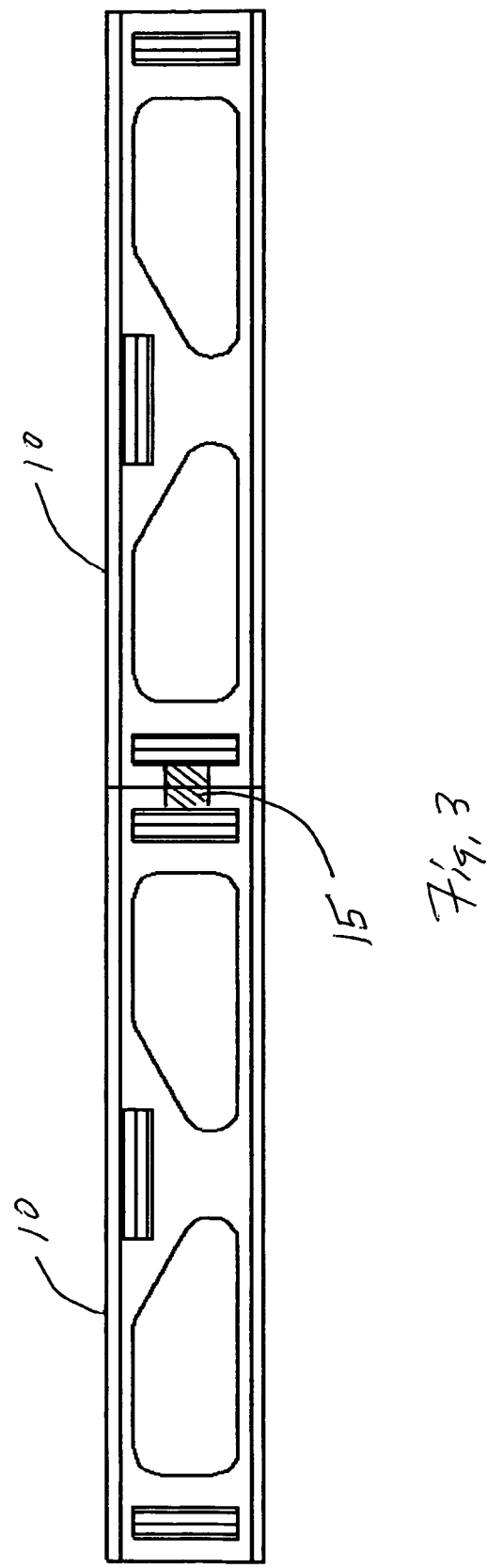
FIG. 3 is a back view of the folding level in an extended form.

FIG. 3 illustrates the back view of the folding level in an extended form. In this drawing, two level segments 10 are abutted end-to-end and joined in a locked position by locking means 15. The locking means holds the two segments securely together so the extended level can be handled as a single unit. The top and bottom surfaces of the two joined level segments each form a single smooth flat surface with a straight edge when the folded level is extended.

Figure 4:
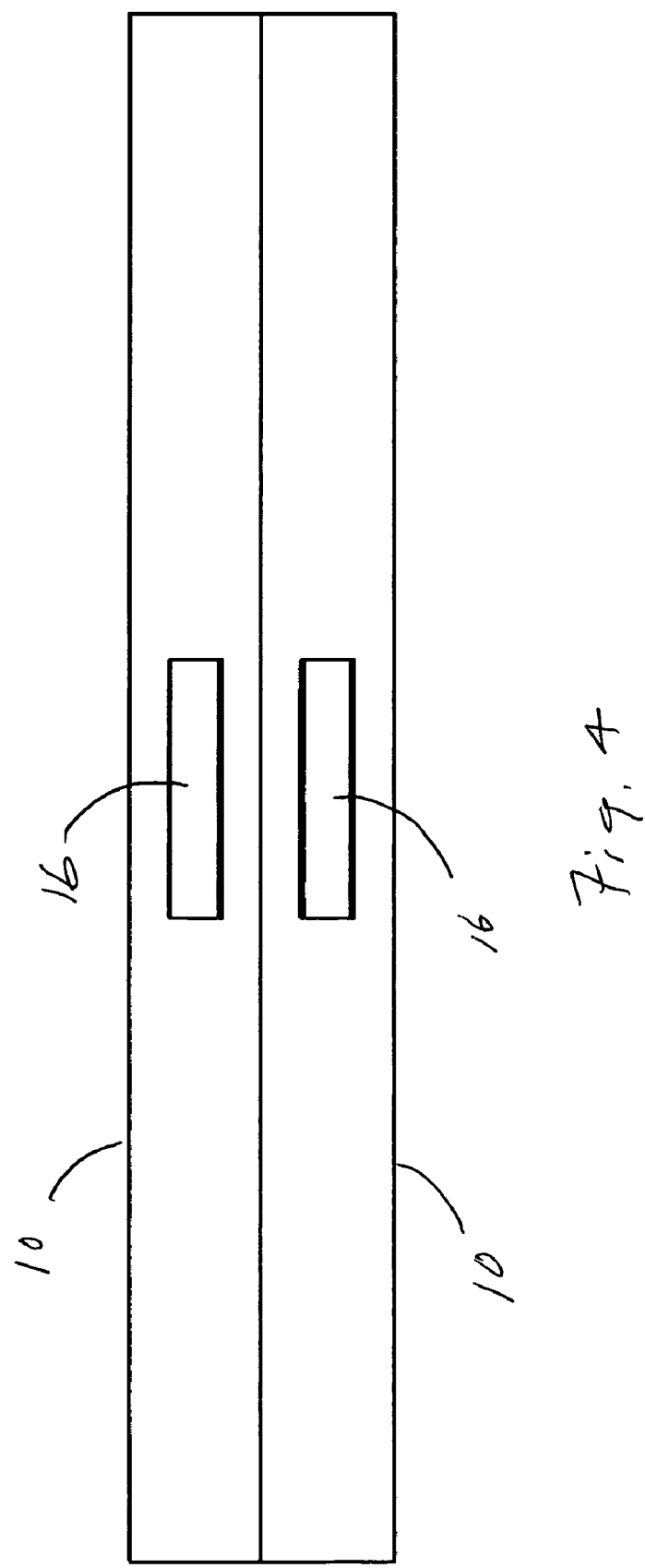
FIG. 4 is a top view of the level with the two segments folded side-by-side.

FIG. 4 illustrates a top view of the folding level with the two level segments 10 abutted side-by-side. An aperture 16 is cut into the top surface of each of the level segments as sight openings for the leveling bubbles in the tubular spirit vials.

Figure 5:
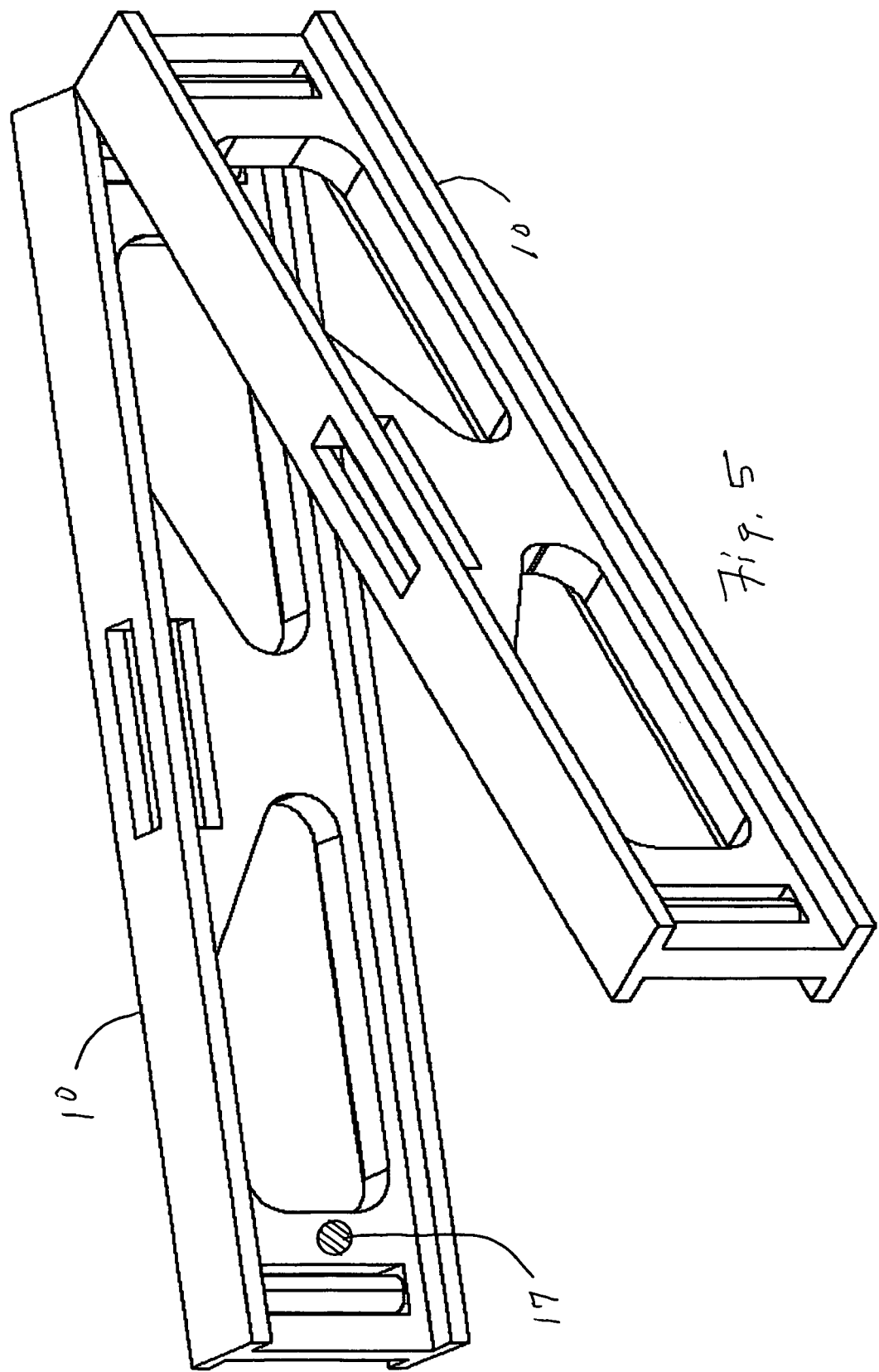
FIG. 5 is a perspective view of the folding level partially opened.

FIG. 5 is a perspective view of the folding carpenter's level when partially opened. This perspective shows the I-beam construction of the level segments and it shows a fastening means 17, such as a magnet, located on the back side of each of the level segments.

We claim:

1. A folding carpenter's level which comprises (a) two level segments, each of which has a smooth flat top surface, that are hingeably attached at a distal tip by means of a hinge and can be rotated laterally in the plane of the level so as to be oriented with respect to each other at angles of from 0 to 180 degrees, and (b) at least one of said level segments has one or more tubular spirit vials attached to the segment, one of which is useful for measuring the levelness of the top surface of the segment with respect to horizontal.

2. The folding carpenter's level defined by claim 1 wherein each of the two level segments have one or more tubular spirit vials attached to the segment, one of which is useful for measuring the levelness of the top surface of the segment with respect to horizontal.

3. The folding carpenter's level defined by claim 1 wherein said tubular spirit vials are each positioned in an aperture in the level segments so that the leveling bubble in the tubular spirit vial can be seen from the front or back of the level segment.

4. The folding carpenter's level defined by claim 1 additionally comprising a recessed fastening means attached at the end of the level segments opposite the hinging means.

5. The folding carpenter's level defined by claim 1 additionally comprising a locking means to secure the level segments when the segments are rotated to be oriented with respect to each other at an angle of 180 degrees and the folding level is expanded to its full length and the tops of the segments form a smooth straight edge, from a side view perspective.

6. The folding carpenter's level defined by claim 2 wherein each of the level segments has three tubular spirit vials, one of which is oriented horizontally and the other two are oriented vertically, the horizontally oriented tubular spirit vial being positioned at or near the top and towards the center of the level segment to which it is attached, and the vertically oriented tubular spirit vials are located towards each end of the level segment, from a front view of such segments.

7. The folding carpenter's level defined by claim 6 wherein said tubular spirit vials are each positioned in an aperture in the level segments so that the leveling bubble in each of the tubular spirit vials can be seen from the front or back of the level segment, and wherein the leveling bubble in each of the horizontally oriented tubular spirit vial can be seen from the top of the level segments.

8. The folding carpenter's level defined by claim 1 wherein the level segments have an I-beam construction.

9. The folding carpenter's level defined by claim 7 wherein the level segments have an I-beam construction and the front, back, top and bottom of each of the level segments is rectangularly shaped and the top and bottom surfaces of each segment are smooth flat surfaces, and wherein said folding level additionally comprises (a) a recessed fastening means attached at the end of the level segments opposite the hinging means, and (b) a locking means to secure the level segments when the segments are rotated to be oriented with respect to each other at an angle of 180 degrees and the folding level is expanded to its full length and the tops of the segments form a smooth straight edge, from a side view perspective.

10. The folding carpenter's level defined by claim 9 wherein the fastening means is a magnetic means and wherein the locking means is a locking latch.

\* \* \* \* \*